March 14, 1967 L. D. LAKE 3,308,914
ELECTRONIC COIN COUNTING SYSTEM
Filed July 19, 1965 8 Sheets-Sheet 1

INVENTOR.
LELYN D. LAKE
BY
ATTORNEY

March 14, 1967 L. D. LAKE 3,308,914
ELECTRONIC COIN COUNTING SYSTEM
Filed July 19, 1965 8 Sheets-Sheet 2

INVENTOR.
LELYN D. LAKE
BY
ATTORNEY

March 14, 1967          L. D. LAKE          3,308,914

ELECTRONIC COIN COUNTING SYSTEM

Filed July 19, 1965          8 Sheets-Sheet 4

INVENTOR.
LELYN D. LAKE

BY

ATTORNEY

March 14, 1967 L. D. LAKE 3,308,914
ELECTRONIC COIN COUNTING SYSTEM
Filed July 19, 1965 8 Sheets-Sheet 5

INVENTOR.
LELYN D. LAKE
BY
ATTORNEY

March 14, 1967     L. D. LAKE     3,308,914
ELECTRONIC COIN COUNTING SYSTEM
Filed July 19, 1965     8 Sheets-Sheet 6

INVENTOR
LELYN D. LAKE
BY
ATTORNEY

INVENTOR.
LELYN D. LAKE
BY
ATTORNEY

United States Patent Office 3,308,914
Patented Mar. 14, 1967

3,308,914
ELECTRONIC COIN COUNTING SYSTEM
Lelyn D. Lake, Carmel, Ind., assignor to P. R. Mallory & Co. Inc., Indianapolis, Ind., a corporation of Delaware
Filed July 19, 1965, Ser. No. 472,905
16 Claims. (Cl. 194—2)

The present invention relates to coin operated devices or equipment and more particularly to the means and method for providing an electronic coin counting and change return means to be used in said devices or equipment.

The operation of many types of equipment depends on the deposition of a predetermined amount, or value, of coins. When the required value is deposited, a door will open to make an item available, a gate will open to provide admission to an area, or, in some cases, equipment will provide a service such as shining shoes. Most of the aforementioned equipment is designed to be operated by small amounts of change or a few types of coins and is rather inflexible. Also, most of the coin counting equipment is mechanical and, therefore, subject to wear and consequently, failure.

There exists a need for a coin counting and change return means that is completely flexible, very accurate, compact, low cost, and reliable. To be flexible the coin counting and change return means must accept a wide variety of coins and must be easy to preset so as to operate the equipment at any given monetary value. The requirement for accuracy, compactness, low cost, and reliability are self-explanatory.

Accordingly, the present invention provides a novel, efficient, and economical means for meeting the aforementioned requirements. There is presented herein an electronic coin counting and change return means which can be installed in coin operated devices or equipment to actuate the equipment after a desired amount of money has been deposited and to return any change deposited in excess of the desired amount.

The flexibility feature is obtained by providing a register that can be easily preset by a switching means to obtain a predetermined monetary value and to return the excess change. This register can be coupled to a coin acceptor means which is designed to accept any type of coin. The only requirement is to provide a trigger circuit for each type of coin to trigger the circuits in the register. The amount of money that is required to operate the equipment can be increased merely by adding more circuits to the register. For example, if four counting circuits are used, based on a 5¢ counting unit, the four circuits would represent 5¢, 10¢, 20¢ and 40¢ for a total of 75¢ if the register was full. By adding a fifth counter circuit representing 80¢, a total of $1.55 could be obtained. It is possible to add as many counter circuits as are required for any application.

The basic electronic coin counting and change return means can be coupled to a plurality of control circuits for actuating different coin operated devices. For example, the basic electronic coin counting and change return means could be coupled to a plurality of vending machines containing a variety of articles for sale at different prices. A person purchasing an article from one of the vending machines would deposit a quantity of coins and operate a selector switch representing the articles. The selector switch would preset the register to obtain the prices of the desired article and direct the output of the register back to a latching means for releasing the article from the vending machine.

Obviously this basic system could be coupled with a dollar bill changer to permit the use of dollar bills as well as coins. The dollar bill changer would provide the same inputs as the coin acceptor means described in this specification and would only require the addition of another trigger circuit representing one dollar. Thus, even greater flexibility could be obtained in that equipment could be used that requires more than a dollar's worth of change without having an attendant to make change.

The accuracy of the coin counting system of this invention is obtained electronically. The circuitry presented in this specification can count pulses representing coins in fractions of a second and register a summation of these pulses in the same amount of time. Thus, every pulse generated by the deposition of coins will be registered by the coin counting means.

The coin counting and change return means of the present invention is a compact system because the components are electronic components in lieu of the usual mechanical components. With the advent of microelectronics techniques, the system can be made even more compact.

The low cost feature is claimed for the present invention because the components are standard electronic components which are manufactured in high quantities and sold at attractive prices.

The reliability of the present invention is based on the use of electronic components in lieu of mechanical components. It is well understood in the industry that electronic components and circuits are more reliable than mechanical parts and assemblies. Since mechanical counting devices have a multitude of moving parts, all subject to wear and tear, an electronic counter should be much more reliable.

A particularly attractive and novel feature of the present invention is that the circuitry will provide a return of change which is deposited in excess of that amount required to operate the equipment and will automatically reset itself for subsequent operations. This operation is effectively performed even though the coin operated equipment will operate for 5¢ and a half-dollar is deposited.

It is an object of the present invention, therefore, to provide an electronic coin counting and change return means for use in a coin operated device or equipment.

It is a further object of the present invention to provide a coin counting system that is flexible, inexpensive, compact, accurate, and reliable.

It is a further object of the present invention to provide an electronic coin counting means that can be preset to obtain any desired quantity of money merely by adjusting manual switches.

Another object of the present invention is to provide an electronic coin counting system that will register an excessive deposition of coins and actuate a mechanism for return of the correct amount of change.

Yet another object of the present invention is to provide an electronic coin counting system that will automatically reset itself after each operation to prepare for subsequent operations.

Still another object of the present invention is to provide an electronic coin counting system which can be coupled to a plurality of control circuits to operate a plurality of devices from a centralized position.

Yet another object of the present invention is to provide an electronic coin counting system that will accept and register a wide variety of coins.

Yet another object of the present invention is to provide a coin counting system that does not contain movable parts.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention resides in a coin operated device dependent upon a coin input thereto, and comprises means for determining the value of a plurality of coins deposited therein, said value being determined by the summation of a multiplicity of pulses generated by the deposition of said coins, a switching means coupled to a register and triggering said register with said pulses, said register summing said pulses to obtain an amount necessary to operate said device, and said register actuating said device and a coin return mechanism, said coin return mechanism returning an amount of money deposited in excess of that required to operate said device.

Figure 1:
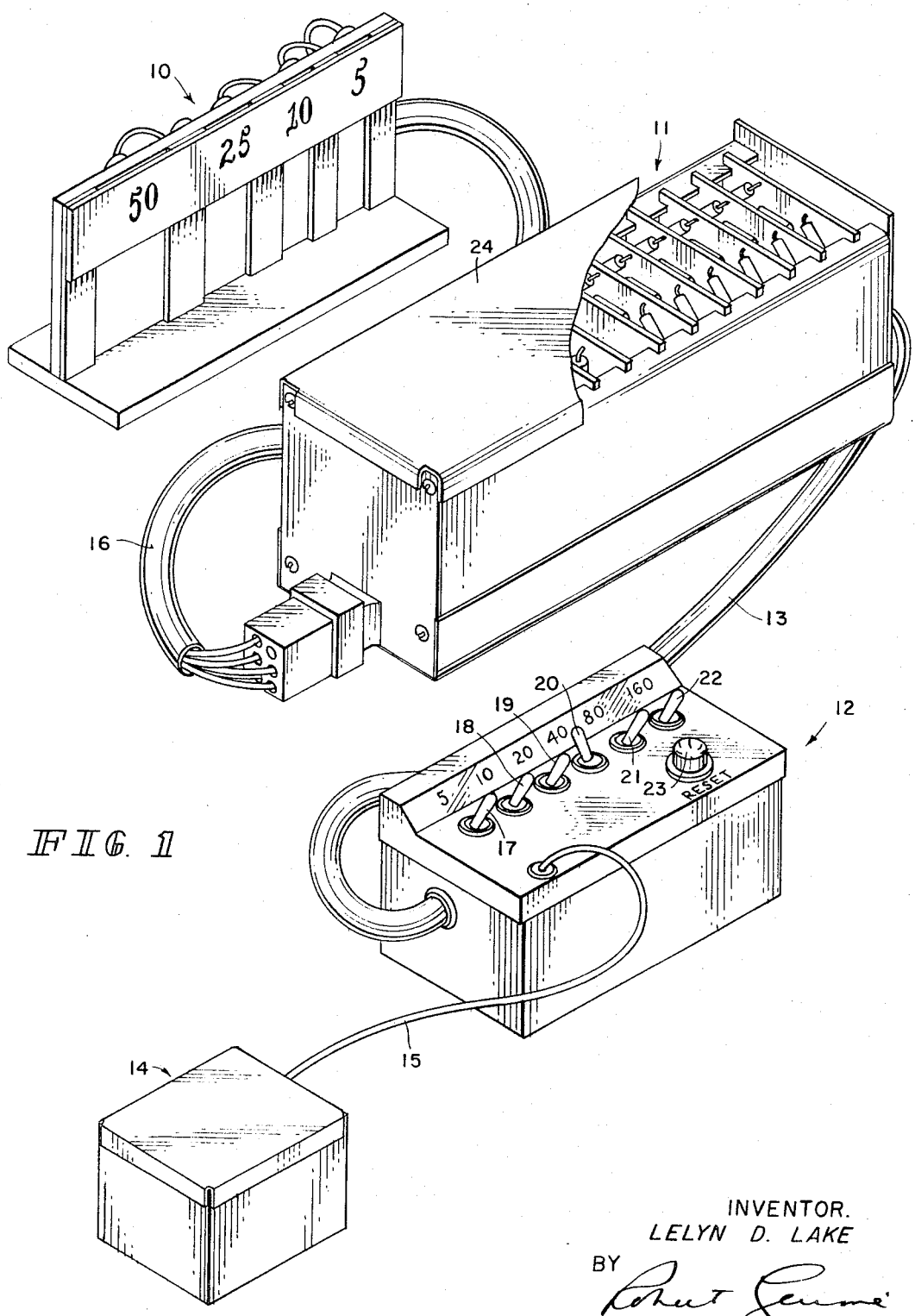
FIGURE 1 is a series of connected perspective views showing the coin acceptor means, electronic circuit assembly, selector switch and reset switch means, load, the interconnecting cabling.

Referring now to the drawing, and particularly to the perspective view of FIGURE 1, the component parts of the coin counting system can be visualized in conjunction with the following description. A coin acceptor means 10 is electrically connected to the electronic circuit assembly 11. The coin acceptor means 10 is shown merely to point out that some means is required to generate electrical pulses to actuate circuits in the electronic assembly. The specific means for generating the electrical pulses by inserting a coin are not a part of this invention and will not be discussed in detail. A selector switch and reset switch means 12 are connected to the electronic circuit assembly 11 by a cable 13 and to a load 14 by a cable 15. Also, there is a cable 16 connecting the coin acceptor means 10 to the electronic circuit assembly 11. The selector switch and reset switch means 12 is shown with switches 17, 18, 19, 20, 21 and 22 for selection of particular monetary sums and a pushbutton switch 23 for manual reset of the counting system circuitry.

Figure 2:
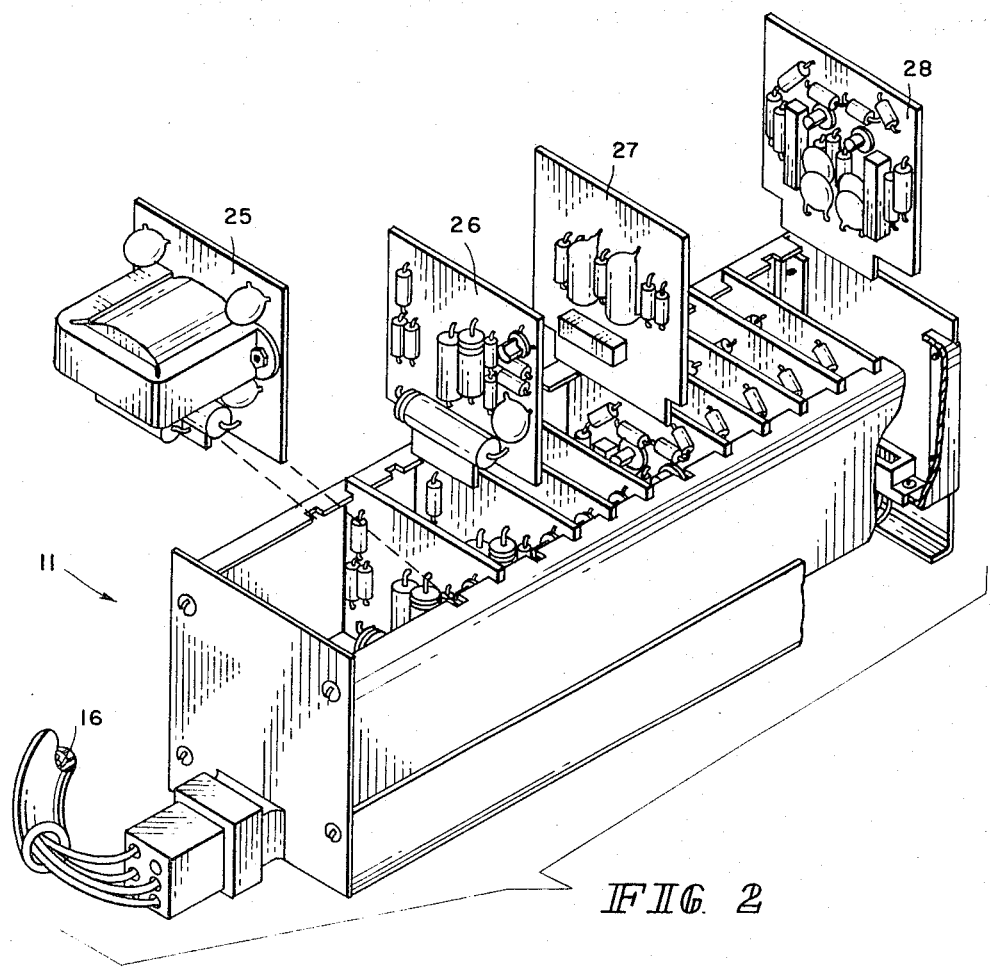
FIGURE 2 is an exploded perspective of the electronic circuit assembly showing several of the circuits removed from the assembly.

Referring now to FIGURE 2, we see the electronic circuit assembly 11 with the cover 24 removed and the power supply circuit 25, trigger circuit 26, coupler circuit 27, and binary counter circuit 28 removed from the assembly. This view is shown to depict a modular approach for packaging the coin counting system described in this specification.

Figure 3:
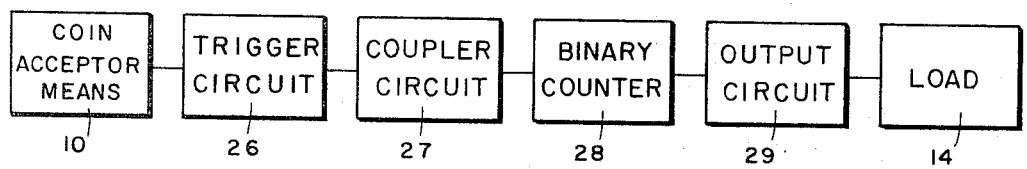
FIGURE 3 is a simplified block diagram of the coin counting system.

Referring now to FIGURE 3, we see a simplified block diagram showing a functional arrangement of the coin acceptor means 10, trigger circuits 26, coupler circuit 27, binary counter circuit 28, output circuit 29 and the load 14.

Figure 4:
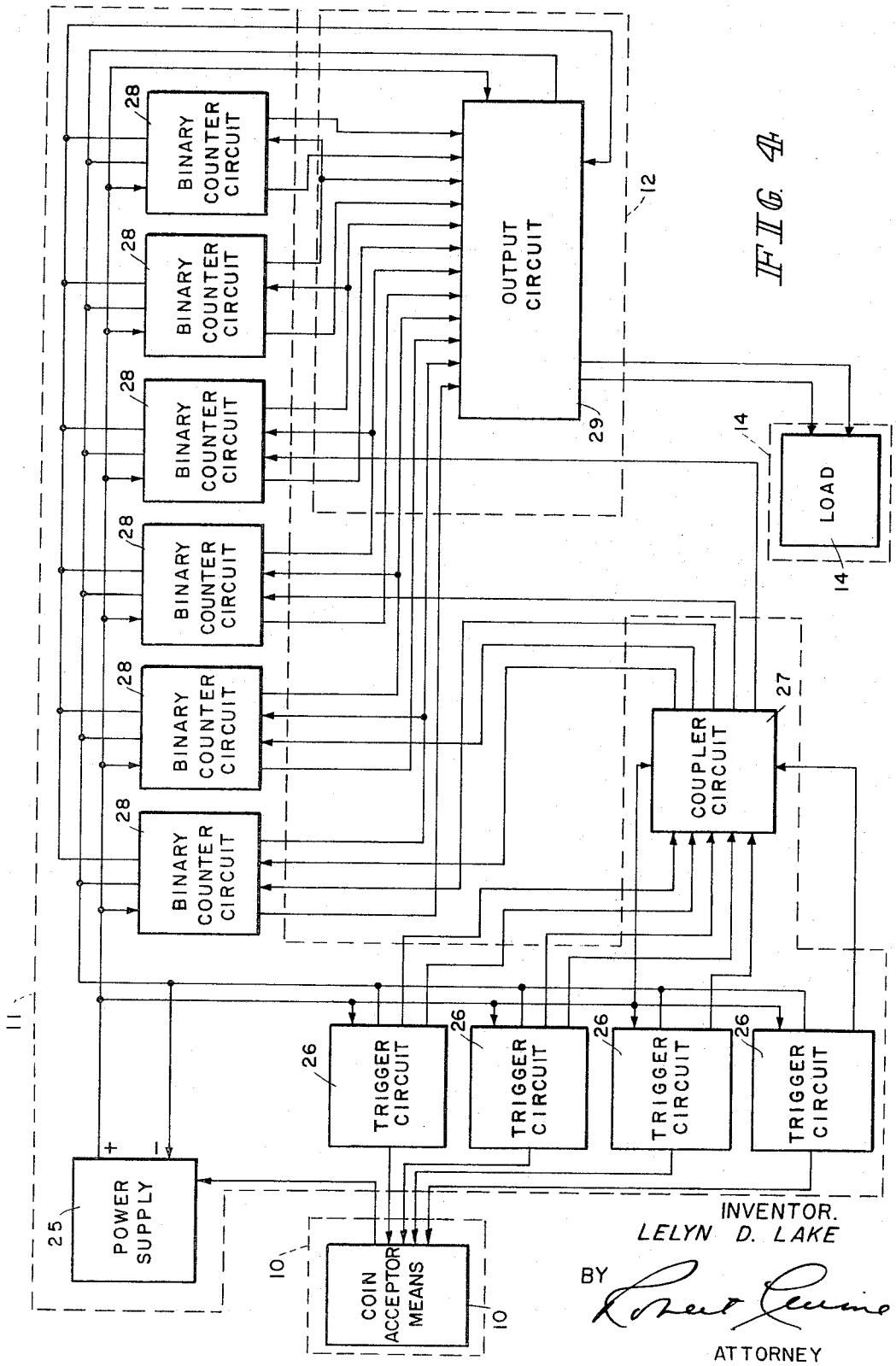
FIGURE 4 is a detailed block diagram showing the functional arrangement of the power supplying circuit, coin acceptor means, trigger circuits, coupler circuits, binary counter circuits, output circuit, and the load.

Referring now to FIGURE 4, we see a detailed block diagram of the coin counting system showing how the various circuits are interconnected to obtain the necessary outputs from given inputs. The coin acceptor means 10 is designed to accept a coin and transmit an electrical pulse representing that coin to one of the four trigger circuits 26. The trigger circuits 26, which will be discussed later, transmit pulses to the coupler circuit 27 and through the coupler circuit 27 to the binary counter circuits 28 or directly to the binary counter circuits 28. The binary counting circuits 28 transmit pulses to the output circuit 29. The output circuit 29 transmits pulses to the load 14 which is a means for activating a coin operated device and, because the output circuit contains the selector switch and reset switch means 12, transmits pulses back to the binary counter circuits 28. The power supply circuit 25 provides direct current power for all of the various electronic circuits of the coin counting system.

Figure 5:
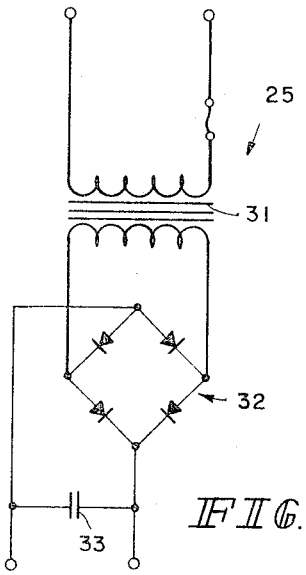
FIGURE 5 is a schematic of the power supply which provides direct current to the cooperating circuits in the coin counting system.

Referring now to FIGURE 5 we see a schematic of the power supply circuit 25 which supplies direct current to all of the various electronic circuits in the coin counting system. The power supply circuit 25, which is old to the art, has a transformer 31 coupled to a bridge rectifier circuit 32 with a filtering capacitor 33 coupled across the output leads of the power supply circuit 25.

Figure 6:
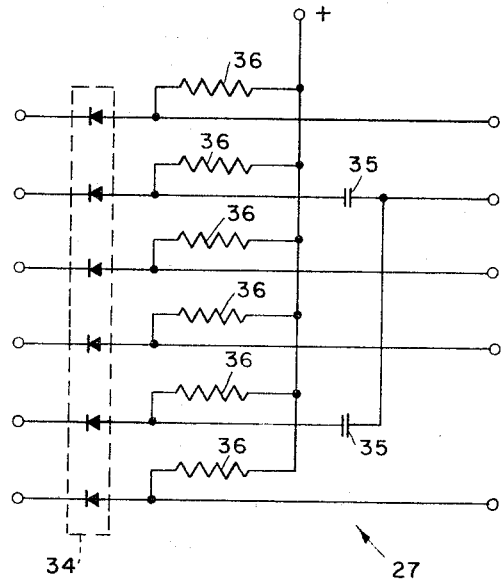
FIGURE 6 is a schematic of the coupler circuit which couples the trigger circuits to the binary counter circuits.

Referring now to FIGURE 6 we see a schematic of the coupler circuit 27 which couples the output pulses of the trigger circuits 26 to the binary counter circuits 28. As is the case with the power supply circuit 25, the coupler circuit 27 is shown as an example that will work in one embodiment of the present invention. It can be seen that two of the inputs are shown coupled through capacitors 35 which serve to isolate the trigger circuits being coupled. All of the signals are connected through diodes 34 which serve as isolation rectifiers in the coupler circuit 27. Resistors 36 serve to couple the plus side of power supply circuit 25 to the coupler circuit 27.

Figure 7:
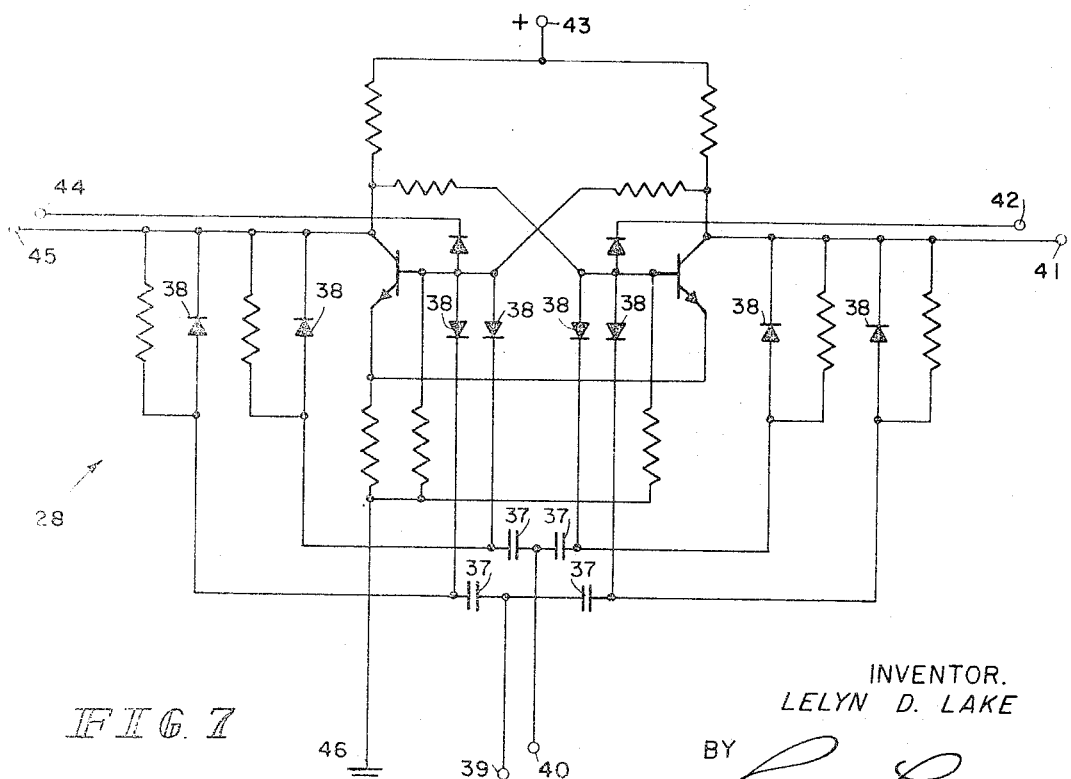
FIGURE 7 is a schematic of the binary counting circuit used in the coin counting system.

Referring now to FIGURE 7, we see a version of a binary counter circuit 28 that will function in one embodiment of the present invention. The circuit as shown is a bistable multivibrator or a flip-flop with capacitor and diode trigger steering circuits coupling the inputs from the coupler circuit 27 to the binary counter circuits 28. Capacitor 37 and diodes 38 provide the trigger steering function and are coupled to input terminals 39 and 40. Terminals 41 and 45 are output terminals for the circuit, terminals 42 and 44 are coupled to the preset switch means for presetting the flip-flop to the preferred state, terminal 43 is connected to the positive side of power supply circuit 25, and terminal 46 is connected to ground. The balance of the circuit components are arranged to form a standard flip-flop circuit.

Figure 8:
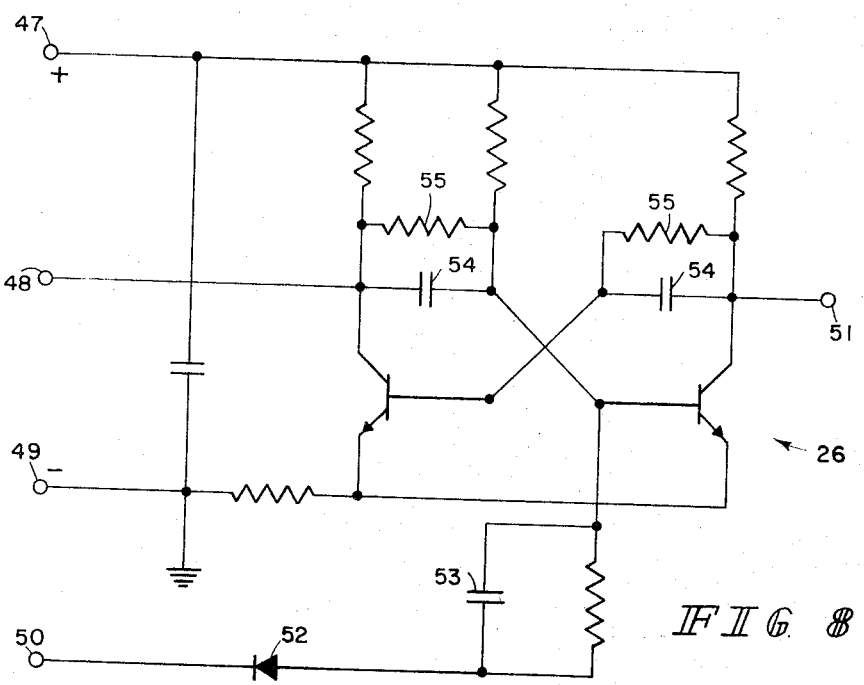
FIGURE 8 is a schematic of the trigger circuit used in the coin counting system.

Referring now to FIGURE 8, we see a schematic of a type of trigger circuit 26 that will work in one embodiment of the present invention. The circuit shown is a typical monostable multivibrator circuit or a "one-shot" switching circuit which is triggered by pulses from the coin acceptor means 10. Terminal 47 is connected to the plus side of power supply circuit 25, terminal 49 is connected to the negative side of power supply circuit 25, terminal 50 is the input terminal connected to the coin acceptor means 10, and terminals 48 and 51 are the output terminals connected to the coupler circuit 27. Diode 52 functions to isolate the trigger circuit 26 and capacitor 53 forms the trigger pulse. Capacitors 54 in parallel with resistors 55 on each side of the "one-shot" circuit functions as a means for holding the circuit in an unstable state for a given period of time. The time between the two states of the trigger circuits 26 serves as a delay time when more than one pulse is to be transmitted to the binary counter circuits 28. This feature is obtained by transmitting one pulse when the trigger circuit 26 changes state and another when it changes back to its original state. The balance of the components are those usually associated with a standard "one-shot" circuit for switching.

Figure 9:
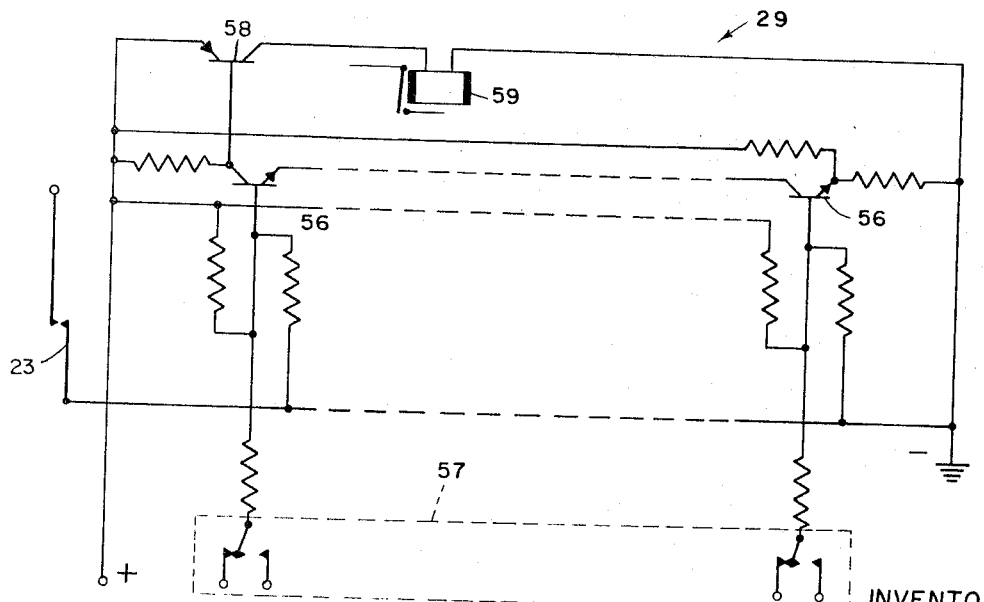
FIGURE 9 is a schematic of one version of an output circuit used in the coin counting system.

Referring now to FIGURE 9, we see one version of an output circuit 29 that will work in an embodiment of the present invention. The circuit shown is a series transistor "And" circuit. The transistors 56, which are normally biased off, can be turned on by a pulse from one of the binary counting circuits 28 if the base of the transistors are connected to the proper output of the binary counter circuits 28 through selector switch means, hereinafter referred to as the preset switch bank 57. When all of the transistors 56 are connected to the proper outputs of the binary counting circuits 28, the series chain will be providing a forward bias for the power transistor 58 which in turn drives the output relay 59 which actuates the load 14. Also shown in FIGURE 9 is the reset switch 23 which resets the binary counter circuits 28 to their original state after the counting cycle is completed.

Figure 10:
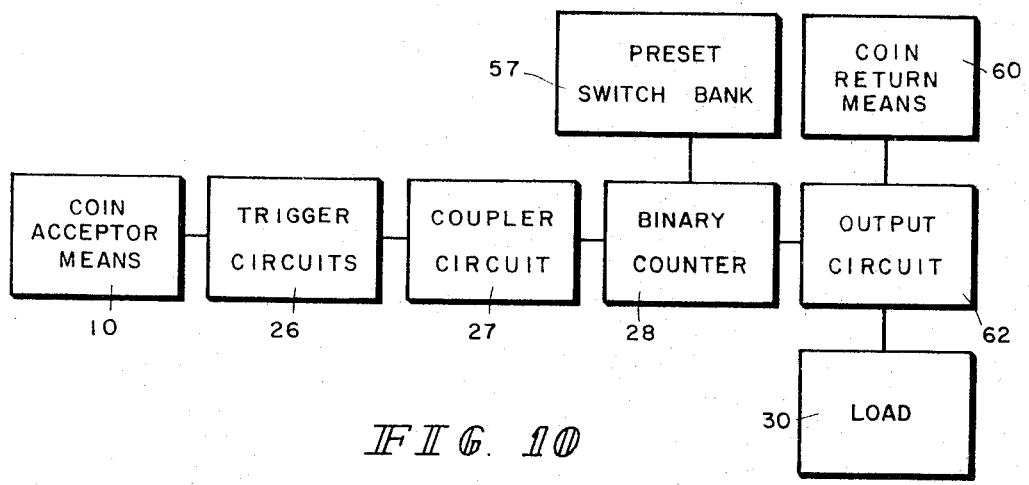
FIGURE 10 is a simplified block diagram of an alternate approach to the coin counting system showing the coin return feature.

Referring now to FIGURE 10 we see a simplified block diagram of the coin counting system with the additional feature of a coin return means 60 added to the system. The preset switch bank 57 and output circuit 62 shown in this block diagram are changed to facilitate the coin return means 60 and an automatic reset feature which is added to make the coin counting system more versatile. Also shown in FIGURE 10 is an alternate load 30 which is a means for actuating the coin operated equipment.

Figure 11:
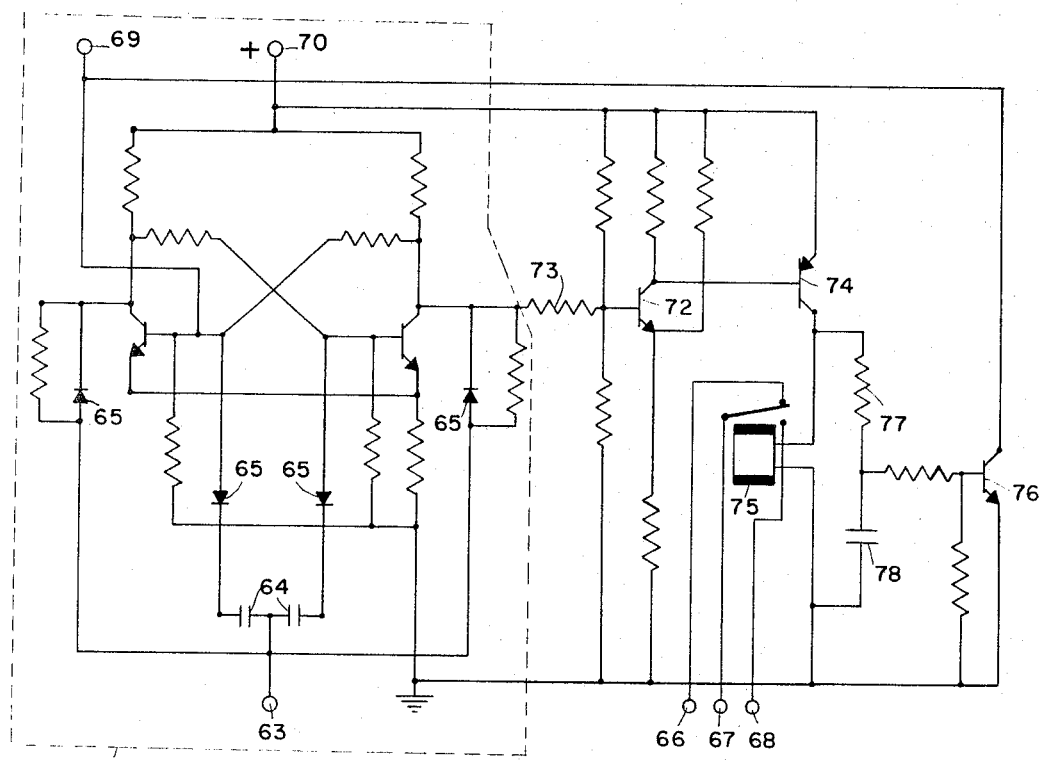
FIGURE 11 is a schematic of an alternate output circuit showing an automatic reset feature and an extra binary counter for change return capability.

Referring now to FIGURE 11, we see an optional output circuit 62 which facilitates the coin return operation and the automatic reset feature. Essentially, this version of the output circuit 62 has a flip-flop circuit which functions as a "changer" binary counter circuit 71, triggered by pulses from the binary counter circuits 28 which are inputs to terminal 63. The input pulses are transmitted through the trigger-steering circuit formed by capacitors 64 and diodes 65. Terminal 69 is connected to the preset switch bank 57, terminal 70 is connected to the positive side of power supply circuit 25 and terminal 67 is connected to the negative side of power supply circuit 25 and terminals 66 and 68 are connected to the load 30. The "changer" binary counter circuit 71 transmits a pulse to the base of transistor 72 through resistor 73, thereby turning on transistor 72. When transistor 72 is turned on, power transistor 74 can conduct because the collector of transistor 72 is coupled to the base of power transistor 74 When power transistor 74 conducts, the output relay 75 which is coupled to the collector of power transistor 74 can actuate the load. In order to provide an automatic reset feature, the voltage across the output relay 75 is coupled to a switching transistor 76 to provide the reset pulse. Resistor 77 and capacitor 78 are coupled across the output relay 75 to provide a time delay sufficient for the automatic reset action.

Figure 12:
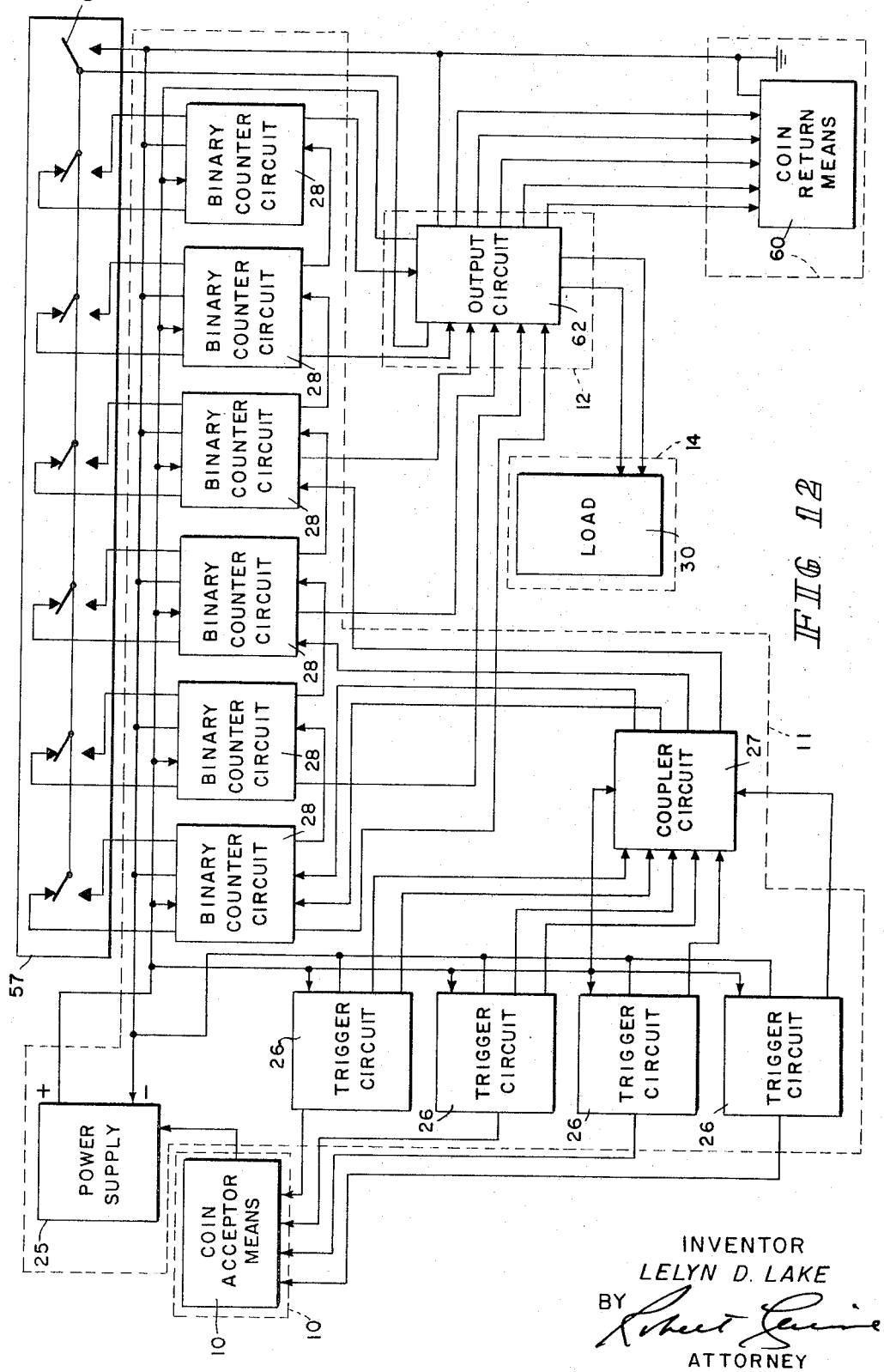
FIGURE 12 is a detailed block diagram of the coin counting system with the coin return feature added to the functional arrangement of circuits.

Referring now to FIGURE 12, we see a detailed block diagram of the coin counting system with the coin return means 60 and an automatic reset feature. The coin acceptor means 10 transmits pulses representing specific coins to the trigger circuits 26 which transmits pulses through the coupler circuit 27 to the binary counter circuits 28. The binary counter circuits 28 preset terminals are coupled through the preset switch bank 57 to the output circuit 62, shown in FIGURE 11. The output terminal 45, not designated in FIGURE 12, of each of the binary counter circuits 28 are coupled to the input terminals 39, not designated in FIGURE 12, of the next binary counter until the last binary counter in the register which has the output terminal 45 coupled to the output circuit 62. Also, separate outputs from the binary counter circuits 28 are connected to the output circuit 62 to establish the amount of change to be returned. The output circuit 62 is connected to the load 30 and to a coin return means 60 which is the means for indicating the amount of overage and for returning the excess change. Manual reset switch 61 is used to connect the preset switch bank 57 to ground.

Figure 13:
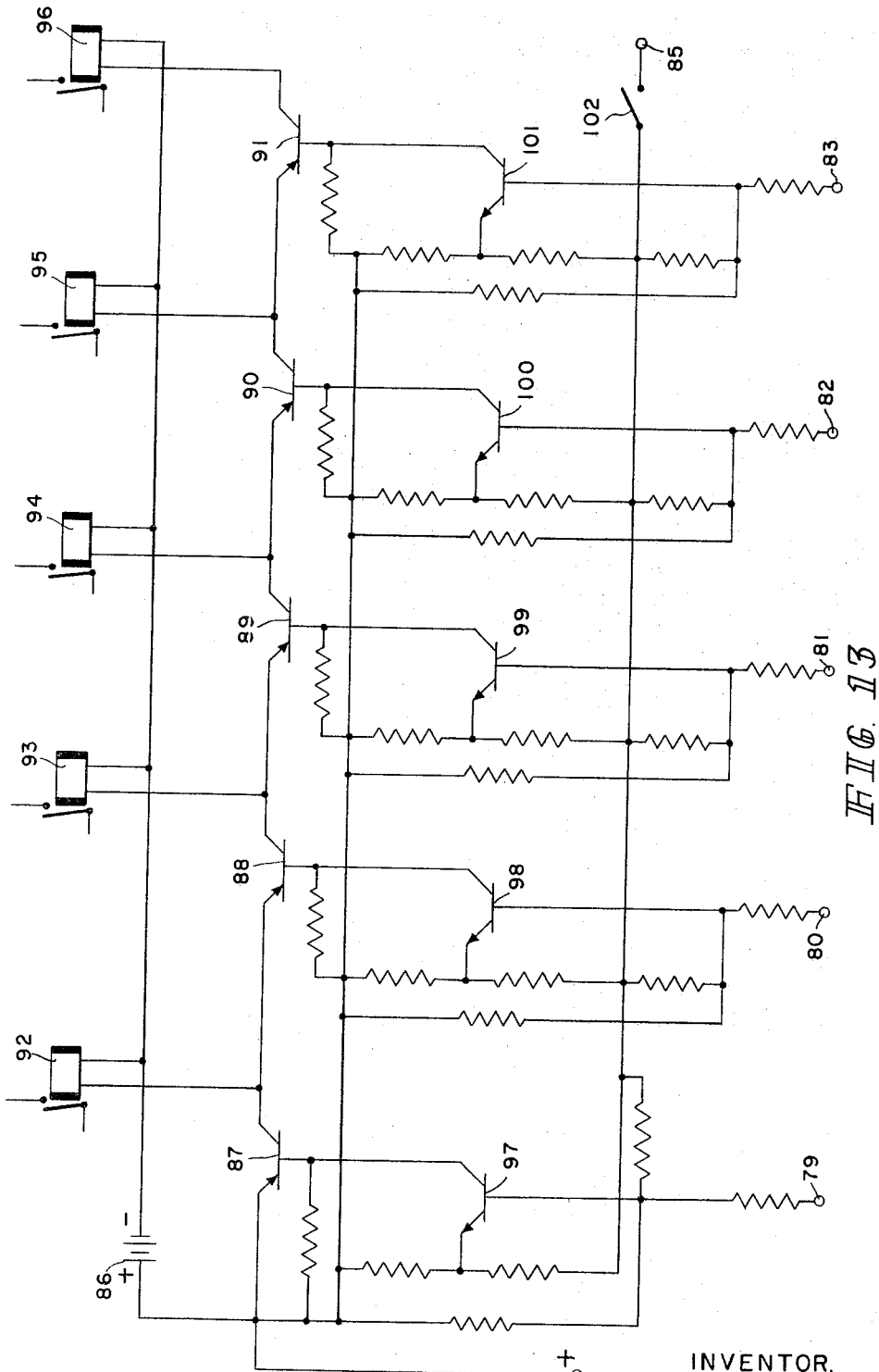
FIGURE 13 is a schematic of another alternate output circuit showing the circuitry for actuating a coin return mechanism as well as the circuitry for actuating the coin operated equipment.

Referring now to FIGURE 13 we see another optional output circuit which includes circuitry for actuating the coin return means 60, shown in FIGURE 12, as well as circuitry for actuating the coin operated equipment. Terminals 79, 80, 81, 82, and 83 are connected to output terminals of the various binary counter circuits 28 and serve as input terminals for the output circuit 62. Terminal 84 is connected to the plus side of power supply circuit 25 and terminal 85 is connected to the negative side of power supply circuit 25. A separate power source 86 is provided to energize power transistors 87, 88, 89, 90, and 91, and relays 92, 93, 94, 95, and 96. Switching transistors 97, 98, 99, 100, and 101 are in the base circuits of power transistors 87, 88, 89, 90, and 91 and connected to the input terminals 79, 80, 81, 82, and 83. Switch 102 is a manual reset switch. The balance of the circuit components are load and biasing resistors for the transistor.

With the above description of circuits and functions in mind, and by making reference to the drawing figures, the following analysis of operation will serve to convey the details of the coin counting system operation.

The person operating a coin operated device or machine would drop coins in the coin acceptor means 10. Each coin, as it is dropped, would cause the coin acceptor means 10 to contact one of the trigger circuits 26 to negative. The trigger circuits 26, described in FIGURE 8 of this specification, are monostable multivibrators which will switch to their unstable state when triggered by a negative pulse and will stay in the unstable state a period of time determined by an applicable resistor 55—capacitor 54 timing circuit. It is recognized that other types of circuits could perform the function of the trigger circuit 26 that is described in this specification and, for that reason, the circuit will be continually referred to as a triggering means, as a means for transmitting pulses to counter circuits, as a switching means, or as a means for triggering a counter means.

The outputs from the trigger circuits 26 are connected through isolation rectifiers 34 in the coupler circuit 27, shown in FIGURE 6, either directly to the input of the proper binary counter circuits 28 or through a coupling capacitor 35 to the proper binary counter circuits 28. The purpose of the coupling capacitors 35 is to isolate trigger circuits 26 which feed a common binary counter circuit 28.

The binary counter circuits 28, shown in FIGURE 7, are bistable multivibrator or flip-flop circuits with a capacitor 37 and diode 38 trigger steering network. As is the case with the trigger circuit 26, other types of circuits could perform the counting function disclosed in this specification. It is for this reason that the binary counting circuits 28 will be referred to as counting circuits, binary counting means or as a counter means or register when referring to all of the circuits. All of the binary counting circuits 28 are preset to their desired state by being coupled to the selector switches 17, 18, 19, 20, 21, and 22 in the preset switch bank 57 of the output circuit 29 shown in FIGURE 9. When a negative pulse is received from the coupler circuit 27, the binary counting circuits 28 will change state. The binary counting circuits 28 are cross coupled so that when a counter switches from its second state back to its first state, it will cause the subsequent counter to change state. Through this cross coupling, counting is achieved in the binary counting means.

The outputs from the binary counting circuits 28 are coupled to the output circuit 29 shown in FIGURE 9. As stated previously, one output circuit 29 described in this specification is a series transistor "And" circuit with the transistor 56 normally biased off. When all of the transistors 56 are connected to the proper side of their respective counting circuit, the seriess chain will be turned on to provide a forward bias for the power transistor 58 which, in turn, drives the output relay 59. The output circuit 29 is connected through single pole-double throw switches in the preset switch bank 57 to the binary counting circuit 28, one transistor 56 in the output circuit 29 to each of the counters. The preset switches selects the state of the counter which will turn on the transistor 56 in the output circuit 29. Thus, by appropriate setting of the selector switches 17, 18, 19, 20, 21, and 22, in the preset switch bank, the binary counting means will operate the output circuit 29 at predetermined settings. The cross coupling as achieved by the coupler circuit 27 allows each of the trigger circuits 26 to stand for multiples of the base unit to be counted. By increasing or decreasing the chain of binary counting circuits 28, the total count available may be increased or decreased. Each unit of value to be counted requires a trigger circuit 26 or a separate means for transmitting pulses to the counter means. For example, four trigger circuits 26 are required to count pennies, nickels, dimes, and quarters. In a coin counting system, the first binary counter could stand for 0 or 1, the second counter could stand for 0 or 2, the third counter could stand for 0 or 4, the fourth counter could stand for 0 or 8, and so on to take advantage of the binary arithmetic used in computers. The trigger circuit 26 corresponding to one penny would cause the first or "0 or 1 counting circuit" to change state. The trigger circuit 26 corresponding to a nickel, connected through the appropriate legs of the coupler circuit 27, would cause the "0 or 4 counting circuit" and the "0 or 1 counting circuit" to change states. Thus, by triggering one or more of the binary counter circuits 28, a value equal to the units counted will be added. It would be necessary to cascade trigger circuits 26 for certain values when more than two binary counter circuits 28 are to be triggered.

For expansion purposes, output circuits could be paralleled to provide for several different selections of output values for the same counter circuitry. The binary counter circuits 28 would actuate each of the output circuits as they counted the proper amount for that particular circuit. The next output pulse from the counter would turn off that particular output circuit. Thus, it would be possible to have a multiple value selection with one coin acceptor means 10 and counter means by using multiple output circuits for the various selections desired.

Further development of the basic coin counting system as previously discussed has made other modes of operation available. One of these modes has to do with a coin return means for making change when an amount greater than the value preset into the binary counting circuits 28 is dropped into the coin acceptor means 10. The basic binary counting circuits 28 are used in a cascading manner so that the operation of a preceding counter causes operation of the subsequent counter. A detailed block diagram of this arrangement of circuitry is shown in FIGURE 12. The preset switch bank 57 is connected so that any desired amount may be preset in the binary counting circuits 28. For example, if four binary counters are used, based on a 5¢ counting unit, the four units would represent 5¢, 10¢, 20¢, and 40¢. By presetting the binary counting circuits 28 so that all four provide an output, a total of 75¢ is established. If 5¢ were deposited, the "changer" binary counter circuit 71, shown in FIGURE 11, would be actuated and the original four binary counters would return to their original state. The "changer" binary counter circuit 71 would trigger the output circuit 62 to operate the load 30 and to actuate the coin return means 60.

In another example, if the four binary counter circuits 28 are preset with a count of 10¢, a deposit of 70¢ would cause the "changer" binary counter circuit 71 to operate and produce the required output. Because the "changer" binary counter circuit 71 will not again be actuated until the amount counted has doubled the total amount of the counter means, the counter means will provide an output from the time it has received the exact amount required until it has received the exact amount plus the total provided by the counter means. The term counter means refers to all of the binary counter circuits 28. In my previous example, the binary counting circuits 28 in the counter means were preset for 75¢ and a nickel was deposited. The "changer" binary counter circuit would register and the four original binary counter circuits 28 would return to their original state and the output circuit 62 would be turned on. If this system were to receive 5¢ in excess of the required amount, the 5¢ binary counter circuit 28 would register the extra 5¢. The same condition would apply for excesses of 5¢, 10¢, 20¢, or 40¢. Combinations of operated binary counter circuits 28 could indicate excesses in 5 increments up to the total of the four basic binary counter circuits 28, or 75¢. By the coin return means 60, which can be actuated only when the output circuit 62 has been triggered, the amount of overage can be indicated and, through a coin return mechanism, could be returned to the person depositing said coins.

Another optional output circuit is shown in FIGURE 13. This output circuit contains circuitry for actuating a coin return mechanism as well as the coin operated equipment. The function of this circuit is to take outputs from the binary counter circuits 28 and to use those outputs to operate relays which energize external circuitry. For instance, when the proper amount of money has been deposited in the coin acceptor means 10, the binary counter circuit 28 will transmit a pulse to terminal 79 which will trigger transistor 97. Since transistor 97 is in the base circuit of power transistor 87, power transistor 87 will be turned on to energize relay 92. When power transistor 87 is conducting, voltage from the collector of power transistor 87 is applied to the emitters of power transistors 88, 89, 90, and 91. Thus, power transistors 88, 89, 90, and 91 can only conduct if power transistor 87 is conducting and the coin operated equipment has been actuated by relay 92. If more change has been deposited in the coin acceptor means 10 than is required to actuate the coin operated equipment, the binary counter circuits representing the overage will transmit pulses to terminals 80, 81, 82, and/or 83. If we assume that terminal 80 is connected to the binary counter circuit 28 representing one nickel and that a nickel too much has been deposited, an input will be applied to terminal 80 which will trigger transistor 98 which will, in turn, allow power transistor 88 to conduct and energize relay 93. Relay 93 would actuate a coin return mechanism for nickels and allow one nickel to be returned. Other amounts of change can be returned in the same manner.

The automatic reset mode of operation is obtained by coupling the voltage across the output relay 75 in the output circuit 62, shown in FIGURE 9, through a transistor 76 to provide the reset pulse. Time delay sufficient to provide the necessary momentary contact is provided by a resistor 77-capacitor 78 network in the bast circuit of the transistor 76.

Positive reset after a power interruption presents many problems because of the timing constants of the power supply circuit 25 and the number of binary counter circuits 28. In order to solve this problem, a battery of proper voltage can be connected across the power supply to provide a temporary voltage source for the coin counting system when the main source is interrupted. This battery is sufficient to maintain the counter in its current state and provide power for proper operation of the counter through moderate periods of external power failure.

The counting system of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A coin operated device comprising: coin acceptor means for receiving coins of different monetary values, a plurality of trigger circuits each operable to sense the presence of coins within said coin acceptor means and to generate at least one pulse in response to the presence of each of said coins, a coupler circuit connected to said trigger circuits for combining selected ones of said pulses into further pulses representing multiples of a base monetary unit, an electronic counting means connected to said coupler circuit for couting and totaling said further pulses, an output circuit connected to said electronic counting means actuated when said electronic counting means reaches a predetermined overflow count, said output circuit causing actuation of said coin operated device when said overflow count is reached, and means for resetting said electronic counting means for subsequent operations.

2. A coin operated device comprising: coin acceptor means for receiving coins of different monetary values, a plurality of trigger circuits each operable to sense the presence of coins within said coin acceptor means and to generate at least one pulse in response to the presence of each of said coins, a coupler circuit connected to said trigger circuits for combining selected ones of said pulses into binary pulses representing multiples of a base monetary unit, an electronic counting means connected to said coupler circuit including a plurality of binary counter circuits connected together in cascade to provide a register for counting and totaling said binary pulses, an output circuit connected to said electronic counting means actuated when said electronic counting means reaches a predetermined overflow count, said output circuit causing actuation of said coin operated device when said overflow count is reached, and means for resetting said electronic counting means for subsequent operations.

3. A coin operated device comprising: coin acceptor means for receiving coins of different monetary values, a plurality of monostable multivibrator trigger circuits each operable to sense the presence of coins within said coin acceptor means and to generate at least one pulse in response to the presence of each of said coins, a coupler circuit connected to said monostable multivibrator trigger circuits for combining selected ones of said pulses into binary pulses representing multiples of a base monetary unit, an electronic counting means connected to said coupler circuit including a plurality of binary counter circuits connected together in cascade to provide a register for counting and totaling said binary pulses, an output circuit connected to said electronic counting means actuated when said electronic counting means reaches a predetermined overflow count, said output circuit causing actuation of said coin operated device when said overflow count is reached, and means for automatically resetting said electronic counting means for subsequent operations.

4. In a coin operated device, a coin acceptor means for receiving coins of different monetary values, a plurality of monostable multivibrator trigger circuits each operable to sense the presence of coins within said coin acceptor means and to generate at least one pulse in response to the presence of each of said coins, a coupler circuit connected to said monostable multivibrator trigger circuits for combining selected ones of said pulses into binary pulses representing multiples of a base monetary unit, an electronic counting means connected to said coupler circuit including a plurality of bistable multivibrator counter circuits connected together in cascade to provide a register for counting and totaling said binary pulses, an output circuit connected to said electronic counting means actuated when said electronic counting means reaches a predetermined overflow count, said output circuit causing actuation of said coin operated device when said overflow count is reached, and means for automatically resetting said electronic counting means for subsequent operations.

5. In a coin operated device, a coin acceptor means for receiving coins of different monetary values, a plurality of monostable multivibrator trigger circuits each operable to sense the presence of coins within said coin acceptor means regardless of the number of said coins and regardless of the order of the deposition of said coins therein, said trigger circuits generating at least one pulse in response to the presence of each of said coins, a coupler circuit connected to said monostable multivibrator trigger circuits for combining selected ones of said pulses into binary pulses representing multiples of a base monetary unit, an electronic counting means connected to said coupler circuit including a plurality of bistable multivibrator counter circuits connected together in cascade to provide a register for counting and totaling said binary pulses, an output circuit connected to said electronic counting means actuated when said electronic counting means reaches a predetermined overflow count, said output circuit causing actuation of said coin operated device when said overflow count is reached, and means for automatically resetting said electronic counting means for subsequent operations after operation of said coin operated device.

6. In a coin operated device, a coin acceptor means for receiving coins of different monetary values, a plurality of monostable multivibrator trigger circuits each operable to sense the presence of coins within said coin acceptor means regardless of the number of said coins and regardless of the order of the deposition of said coins therein, said trigger circuits generating at least one pulse in response to the presence of a base monetary coin and two pulses in response to the presence of other coins, a coupler circuit connected to said monostable multivibrator trigger circuits for combining selected ones of said pulses into binary pulses representing multiples of a base monetary unit, an electronic counting means connected to said coupler circuit including a plurality of bistable multivibrator counter circuits connected together in cascade to provide a register for counting and totaling said binary pulses, an output circuit connected to said electronic counting means actuated when said electronic counting means reaches a predetermined overflow count, said output circuit causing actuation of said coin operated device when said overflow count is reached, and means for automatically resetting said electronic counting means for subsequent operations after operation of said coin operated device.

7. A coin operated device comprising: coin acceptor means for receiving coins of different monetary values; a plurality of trigger circuits each operable to sense the presence of a coin of specified value within said coin acceptor means and to produce at least one pulse thereupon; a coupler circuit for combining selected ones of said pulses into binary pulses representing multiples of a base monetary unit and for transmitting said binary pulses to an electronic counting means for counting and totaling said further pulses; an output circuit adaptable to sense the presence of a therein preset total count within said counting means and thereupon to operate said coin operated device; and means for resetting said counting means for subsequent operations.

8. A coin operated device comprising a coin acceptor means for receiving coins of different monetary values, a plurality of trigger circuits each operable to sense the presence of coins within said coin acceptor means and to generate at least one pulse in response to the presence of each of said coins, a coupler circuit connected to said trigger circuits for combining selected ones of said pulses into further pulses representing multiples of a base monetary unit, an electronic counting means comprising a plurality of binary counter circuits connected together to provide a register, said binary counter circuits counting and totaling said further pulses, means for presetting said binary counter circuits to an initial predetermined setting, an output circuit connected to said electronic counting means actuated when said electronic counting means reaches a determined total count, said output circuit causing actuation of said coin operated device when said total count is reached, coin return means connected to said output circuit and actuated by said electronic counting means to return coins equal in value to the number of pulses received in said binary counter circuits subsequent to the occurrence therein of said total count multiplied by said monetary unit, and means for resetting said electronic counting means for subsequent operations.

9. A coin operated device comprising a coin acceptor means for receiving coins of different monetary values, a plurality of trigger circuits each operable to sense the presence of coins within said coin acceptor means and to generate at least one pulse in response to the presence of each of said coins, a coupler circuit connected to said trigger circuits for combining selected ones of said pulses into binary pulses equivalent to multiples of a base monetary unit, an electronic counting means comprising a plurality of binary counter circuits connected together in cascade to provide a register, said binary counter circuits counting and totaling said binary pulses, means for presetting said cascaded binary counter circuits to an initial predetermined setting, an output circuit connected to said electronic counting means actuated when said electronic counting means reaches a determined total count, said output circuit causing actuation of said coin operated device when said total count is reached, coin return means connected to said output circuit and actuated by said electronic counting means to return coins equal in value to the number of pulses received in said binary counter circuits subsequent to the occurrence therein of said total count multiplied by said monetary unit, and means for resetting said electronic counting means for subsequent operations.

10. A coin operated device comprising a coin acceptor means for receiving coins of different monetary values, a plurality of trigger circuits each operable to sense the presence of coins within said coin acceptor means and to generate at least one pulse in response to the presence of each of said coins, a coupler circuit connected to said trigger circuits for combining selected ones of said pulses into binary pulses equivalent to multiples of a base monetary unit, an electronic counting means comprising a plurality of binary counter circuits connected together in cascade to provide a register, said binary counter circuits counting and totaling said binary pulses, means for presetting said cascaded binary counter circuits to an initial predetermined setting, an output circuit connected to said electronic counting means actuated when said electronic counting means reaches an overflow count, said output circuit causing actuation of said coin operated device when said overflow count is reached, coin return means connected to said output circuit and actuated by said electronic counting means to return coins equal in value to the number of pulses received in said binary counter circuits subsequent to the occurrence therein of said overflow count multiplied by said monetary unit, and means for resetting said electronic counting means to said initial predetermined setting for subsequent operations.

11. A coin operated device comprising a coin acceptor means for receiving coins of different monetary values, a plurality of monostable multivibrator trigger circuits each operable to sense the presence of coins within said coin acceptor means and to generate at least one pulse in response to the presence of each of said coins, a coupler circuit connected to said trigger circuits for combining selected ones of said pulses into binary pulses equivalent to multiples of a base monetary unit, an electronic counting means comprising a plurality of bistable multivibrator counter circuits connected together in cascade to provide a register, said bistable multivibrator counter circuits counting and totaling said binary pulses, means for presetting said cascaded bistable multivibrator counter circuits to an initial predetermined setting, an output circuit connected to said electronic counting means actuated when said electronic counting means reaches an overflow count, said output circuit causing actuation of said coin operated device when said overflow count is reached, coin return means connected to said output circuit and actuated by said electronic counting means to return coins equal in value to the number of pulses received in said bistable multivibrator counter circuits subsequent to the occurrence therein of said overflow count multiplied by said monetary unit, and means for resetting said electronic counting means to said initial predetermined setting for subsequent operations.

12. A coin operated device comprising a coin acceptor means for receiving coins of different monetary values, a plurality of monostable multivibrator trigger circuits each operable to sense the presence of coins within said coin acceptor means and to generate at least one pulse in response to the presence of each of said coins, a coupler circuit connected to said trigger circuits for combining selected ones of said pulses into binary pulses equivalent to multiples of a base monetary unit, an electronic counting means comprising a plurality of bistable multivibrator counter circuits connected together in cascade to provide a register, said bistable multivibrator counter circuits counting and totaling said binary pulses, means for presetting said cascaded bistable multivibrator counter circuits to an initial predetermined setting, an output circuit connected to said electronic counting means actuated when said electronic counting means reaches an overflow count, said output circuit causing actuation of said coin operated device when said overflow count is reached, coin return means connected to said output circuit and actuated by said electronic counting means to return coins equal in value to the number of pulses received in said bistable multivibrator counter circuits subsequent to the occurrence therein of said overflow count multiplied by said monetary unit, and means for automatically resetting said electronic counting means to said initial predetermined setting for subsequent operations after operation of said coin operated device.

13. A coin operated device comprising a coin acceptor means for receiving coins of different monetary values, a plurality of monostable multivibrator trigger circuits each operable to sense the presence of coins within said coin acceptor means and to generate at least one pulse in response to the presence of each of said coins, a coupler circuit connected to said trigger circuits for combining selected ones of said pulses into binary pulses equivalent to multiples of a base monetary unit, an electronic counting means comprising a plurality of bistable multivibrator counter circuits connected together in cascade to provide a register, said bistable multivibrator counter circuits counting and totaling said binary pulses, switch means for presetting said cascaded bistable multivibrator counter circuits to an initial predetermined setting, an output circuit connected to said electronic counting means actuated when said electronic counting means reaches an overflow count, said output circuit causing actuation of said coin operated device when said overflow count is reached, coin return means connected to said output circuit and actuated by said electronic counting means to return coins equal in value to the number of pulses received in said bistable multivibrator counter circuits subsequent to the occurrence therein of said overflow count multiplied by said monetary unit, and means for automatically resetting said electronic counting means to said initial predetermined setting for subsequent operations after operation of said coin operated device.

14. A coin operated device comprising a coin acceptor means for receiving coins of different monetary values, a plurality of monostable multivibrator trigger circuits each operable to sense the presence of coins within said coin acceptor means and to generate at least one pulse in response to the presence of each of said coins, a coupler circuit connected to said trigger circuits for combining selected ones of said pulses into binary pulses equivalent to multiples of a base monetary unit, an electronic counting means comprising a plurality of bistable multivibrator counter circuits connected together in cascade to provide a register, said bistable multivibrator counter circuits counting and totaling said binary pulses, switch means for presetting said cascaded bistable multivibrator counter circuits to an initial predetermined setting expressed in multiples of said base monetary unit whereby said electronic counting means will overflow upon receiving a determined number of binary pulses corresponding to a price and will count and record all subsequent pulses from said coupler circuit, an output circuit connected to said electronic counting means actuated when said electronic counting means reaches an overflow count, said output circuit causing actuation of said coin operated device when said overflow count is reached, coin return means connected to said output circuit and actuated by said electronic counting means to return coins equal in value to the number of pulses received in said bistable multivibrator counter circuits subsequent to the occurrence therein of said overflow count multiplied by said monetary unit, and means for automatically resetting said electronic counting means to said initial predetermined setting for subsequent operations after operation of said coin operated device.

15. A coin operated device comprising a coin acceptor means for receiving coins of different monetary values, a plurality of monostable multivibrator trigger circuits each operable to sense the presence of coins within said coin acceptor means and to generate one pulse in response to the presence of a base monetary coin, and two pulses in response to the presence of other coins, a coupler circuit connected to said trigger circuits for combining selected ones of said pulses into binary pulses equivalent to multiples of a base monetary unit, an electronic counting means comprising a plurality of bistable multivibrator counter circuits connected together in cascade to provide a register, said bistable multivibrator counter circuits counting and totaling said binary pulses, switch means for presetting said cascaded bistable multivibrator counter circuits to an initial predetermined setting expressed in multiples of said base monetary unit whereby said electronic counting means will overflow upon receiving a determined number of binary pulses corresponding to a price and will record all subsequent binary pulses from said coupler circuit, an output circuit connected to said electronic counting means actuated when said electronic counting means reaches an overflow count, said output circuit causing actuation of said coin operated device when said overflow count is reached, coin return means connected to said output circuit and actuated by said electronic counting means to return coins equal in value to the number of pulses received in said bistable multivibrator counter circuits subsequent to the occurrence therein of said overflow count multiplied by said monetary unit, and means for automatically resetting said electronic counting means to said initial predetermined setting for subsequent operations after operation of said coin operated device.

16. A coin operated device comprising: coin acceptor means for serially receiving coins of different monetary values; a plurality of trigger circuits each operable to sense the presence within said coin acceptor means of a coin of a particular value and to produce at least one pulse thereupon; a coupler circuit for cross-coupling said pulses from said trigger circuits and for transmitting binary equivalents of said pulses to an electronic counting means comprising a plurality of binary counter circuits cascaded together to provide a register means for receiving said pulses in selected ones of said binary counter circuits and means for presetting said binary counter circuits to the augmented binary complement expressed in multiples of a base monetary unit of a price to be charged whereby said counting means will overflow upon receiving a number of pulses from said coupler circuit corresponding to said price and will thereafter count and record all subsequent pulses from said coupler circuit; an output circuit adapted to operate said device upon the occurrence of said overflow and to sense the total of said subsequent pulses recorded in said counting means; coin return means operable to receive said total and to return coins equal in value to said total multiplied by said base monetary amount; and means for automatically resetting said counting means for subsequent operations.

References Cited by the Examiner

UNITED STATES PATENTS

| | | | |
|---|---|---|---|
| 3,023,874 | 3/1962 | Zindel | 194—10 |
| 3,140,765 | 7/1964 | Sundblad et al. | 133—2 X |
| 3,215,240 | 11/1965 | Keim et al. | 194—2 |

ROBERT B. REEVES, *Primary Examiner.*

STANLEY H. TOLLBERG, *Examiner.*